United States Patent
Åstrand et al.

(10) Patent No.: US 9,591,682 B2
(45) Date of Patent: Mar. 7, 2017

(54) AUTOMATIC PASSWORD HANDLING

(71) Applicant: Sony Corporation, Tokyo (JP)

(72) Inventors: Per Åstrand, Lund (SE); Henrik Bengtsson, Lund (SE); Aleksandar Rodzevski, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 232 days.

(21) Appl. No.: 14/382,394

(22) PCT Filed: Mar. 19, 2014

(86) PCT No.: PCT/IB2014/059981
§ 371 (c)(1),
(2) Date: Sep. 2, 2014

(87) PCT Pub. No.: WO2015/083013
PCT Pub. Date: Jun. 11, 2015

(65) Prior Publication Data
US 2016/0249211 A1    Aug. 25, 2016

Related U.S. Application Data

(60) Provisional application No. 61/942,753, filed on Feb. 21, 2014, provisional application No. 61/912,223, filed on Dec. 5, 2013.

(51) Int. Cl.
*H04W 76/02* (2009.01)
*H04B 7/26* (2006.01)
(Continued)

(52) U.S. Cl.
CPC .......... *H04W 76/023* (2013.01); *G06F 21/32* (2013.01); *G06F 21/34* (2013.01); *G06F 21/35* (2013.01);
(Continued)

(58) Field of Classification Search
None
See application file for complete search history.

(56) References Cited

U.S. PATENT DOCUMENTS

| 6,580,356 B1 | 6/2003 | Alt et al. |
| 7,202,773 B1 | 4/2007 | Oba et al. |

(Continued)

FOREIGN PATENT DOCUMENTS

| EP | 1596538 A1 | 11/2005 |
| EP | 2018038 A2 | 1/2009 |

(Continued)

OTHER PUBLICATIONS

International Search Report mailed May 21, 2014 in re International Application No. PCT/IB2014/059981 filed Mar. 19, 2014.

(Continued)

*Primary Examiner* — Diane Mizrahi
(74) *Attorney, Agent, or Firm* — Coats & Bennett, PLLC

(57) ABSTRACT

A user of a cellular telephone also has a peripheral device, such as a wristlet or ring, for example, that is worn on, and contacts, the user's body. When the user depresses a user control, such as a power button or other control on the cellular telephone, a Body Area Network (BAN) communication link is established between the cellular telephone and the peripheral device. The BAN link utilizes the user's body as a transmission medium to carry data between the cellular telephone and the peripheral device. Additionally, a passcode stored at the peripheral device is sent to the cellular telephone over the BAN link. If the passcode is valid, the device will bypass a passcode entry screen and unlock the cellular telephone for the user.

18 Claims, 5 Drawing Sheets

(51) Int. Cl.
| | |
|---|---|
| H04B 13/00 | (2006.01) |
| H04L 29/06 | (2006.01) |
| H04W 12/06 | (2009.01) |
| G06F 21/34 | (2013.01) |
| G06F 21/35 | (2013.01) |
| G07C 9/00 | (2006.01) |
| H04L 9/32 | (2006.01) |
| H04L 9/08 | (2006.01) |
| H04W 4/00 | (2009.01) |
| G06F 21/32 | (2013.01) |
| H04L 12/26 | (2006.01) |
| H04L 29/08 | (2006.01) |
| H04M 1/725 | (2006.01) |
| H04W 8/00 | (2009.01) |
| B60R 25/20 | (2013.01) |

(52) U.S. Cl.
CPC ...... *G07C 9/00111* (2013.01); *G07C 9/00309* (2013.01); *H04B 7/26* (2013.01); *H04B 13/005* (2013.01); *H04L 9/0827* (2013.01); *H04L 9/3215* (2013.01); *H04L 43/10* (2013.01); *H04L 63/0853* (2013.01); *H04L 63/0861* (2013.01); *H04L 67/141* (2013.01); *H04M 1/7253* (2013.01); *H04W 4/008* (2013.01); *H04W 8/005* (2013.01); *H04W 12/06* (2013.01); *B60R 25/2027* (2013.01); *G07C 2009/00809* (2013.01); *H04L 63/18* (2013.01); *H04L 2209/805* (2013.01); *H04L 2209/88* (2013.01); *H04W 76/02* (2013.01)

(56) References Cited

U.S. PATENT DOCUMENTS

| | | | |
|---|---|---|---|
| 7,777,719 | B2 | 8/2010 | Zhao |
| 7,822,983 | B2 | 10/2010 | Aull et al. |
| 8,600,373 | B2 | 12/2013 | Moallemi et al. |
| 8,867,064 | B2 | 10/2014 | Higashi et al. |
| 8,867,995 | B2 | 10/2014 | Kim et al. |
| 8,912,879 | B2 | 12/2014 | Fyke et al. |
| 9,306,628 | B2 | 4/2016 | Konanur et al. |
| 9,351,100 | B2 | 5/2016 | Tarnhed et al. |
| 2005/0008148 | A1 | 1/2005 | Jacobson |
| 2005/0015604 | A1 | 1/2005 | Sundararajan et al. |
| 2005/0243061 | A1 | 11/2005 | Liberty et al. |
| 2007/0145119 | A1 | 6/2007 | Rhelimi |
| 2007/0254728 | A1 | 11/2007 | Moallemi et al. |
| 2007/0282783 | A1 | 12/2007 | Singh |
| 2008/0259043 | A1 | 10/2008 | Buil et al. |
| 2009/0094681 | A1 | 4/2009 | Sadler et al. |
| 2010/0277435 | A1 | 11/2010 | Han et al. |
| 2011/0205156 | A1 | 8/2011 | Gomez et al. |
| 2012/0026129 | A1 | 2/2012 | Kawakami |
| 2012/0133605 | A1 | 5/2012 | Tanaka |
| 2012/0242501 | A1* | 9/2012 | Tran ............... A61B 5/0024 340/870.02 |
| 2012/0249409 | A1 | 10/2012 | Toney et al. |
| 2012/0324368 | A1 | 12/2012 | Putz et al. |
| 2013/0017789 | A1 | 1/2013 | Chi et al. |
| 2013/0147605 | A1 | 6/2013 | Chang et al. |
| 2013/0174049 | A1 | 7/2013 | Townsend et al. |
| 2014/0003636 | A1 | 1/2014 | Bodvarsson et al. |
| 2014/0085050 | A1 | 3/2014 | Luna |
| 2014/0136414 | A1* | 5/2014 | Abhyanker ............ G06Q 50/28 705/44 |
| 2014/0325614 | A1 | 10/2014 | Rhelimi |
| 2015/0162994 | A1* | 6/2015 | Rodzevski ......... G07C 9/00309 455/39 |
| 2015/0163221 | A1* | 6/2015 | Bolin ................. G07C 9/00309 726/7 |
| 2015/0285659 | A1 | 10/2015 | Curtis et al. |
| 2016/0174025 | A1 | 6/2016 | Chaudhri et al. |

FOREIGN PATENT DOCUMENTS

| | | |
|---|---|---|
| EP | 2378748 A1 | 10/2011 |
| EP | 2600319 A1 | 6/2013 |
| JP | 2008073462 A | 4/2008 |
| JP | 2009049951 A | 3/2009 |
| WO | 2011021531 A1 | 2/2011 |

OTHER PUBLICATIONS

Kwak, K. et al., "An Overview of IEEE 802.15.6 Standard", Invited Paper, Feb. 20, 2011, pp. 1-6. Retrieved on Aug. 21, 2014, retrieved from Internet: arxiv.org/pdf/1102.4106.

Bionym, "The Nymi", White Paper, Nov. 19, 2013, pp. 1-28.

\* cited by examiner

AUTOMATIC PASSWORD HANDLING

TECHNICAL FIELD

The present disclosure relates generally to wireless communication devices, and more particularly to unlocking functionality on a cellular telephone responsive to communications with a peripheral device worn on a user's wrist or hand, in which the user's own body is used as a communications medium between the devices.

BACKGROUND

Cellular telephones are generally being configured to store an increasing amount of secure content. Some content is personal, such as the names, addresses, and contact information for any number of a user's contacts, as well as the passwords, for example, that the user may employ to perform secure functions. Other content is not personal, but instead, comprises enterprise data utilized by the user. To protect such data, many cellular telephone manufacturers provide different levels of security.

For example, different manufacturers currently configure their devices to use a variety of different types of screen locks. These locks utilize various technologies to keep the content stored on a user's cellular telephone secure, while allowing only the user to unlock and access the device. Such technologies include, but are not limited to, facial recognition, pattern recognition, Personal Identity Numbers (PINs), and passwords. Generally, when the user attempts to access the cellular telephone functions, the user is presented with a visual prompt to enter a valid code. Entering a valid code, of course, grants the user entry to the cellular telephone for the user, while entering an invalid code denies such entry to the user.

Generally, users find the requirement to always enter a code each time they check their cellular telephones quite cumbersome. As such, user's typically use very simple codes or passwords that are easily compromised and bypassed. For example, a malicious user may view the particular numbers a user enters into a passcode screen when the user manually enters the correct PIN. Where patterns are used, the particular pattern may be deduced by seeing where the user's fingerprint smudges are on the display.

One recent idea is to use Bluetooth Low Energy (LE) to send and receive a key from a wristlet worn by the user to unlock a cellular telephone being held in the user's hand. However, for this technology to work properly, the broadcast radius of the Bluetooth LE must be quite high so as to be able to efficiently manage crossbody interference. Crossbody interference can occur, for example, when the user holds the cellular telephone such that the user's own hand is disposed 35 between the cellular telephone and the wristlet that provides the key. Further, because Bluetooth LE utilizes an air interface as a carrier medium, malicious parties standing a relatively small distance away (e.g., three feet) are still able to eavesdrop and steal the user's PIs or passwords. Additionally, conventional technologies do not consider whether the wristlet is actually being worn by the user at the time it is used to gain access to the cellular telephone. Particularly, the wristlet may simply be held close to the cellular telephone, and need not be currently in contact with the user.

SUMMARY

Embodiments of the present disclosure provide a system and method for automatically unlocking a cellular telephone using a passcode or other data stored on a device worn by a user, such as a wristlet. The passcode or other data is communicated via a Body Area Network (BAN) communications link that utilizes the user's body as the transmission medium. So communicated, the embodiments of the present disclosure help to ensure secure communications between the cellular telephone and the wristlet, and enhance the user's experience with the cellular telephone.

Accordingly, in one embodiment, the present disclosure provides a method for unlocking a cellular telephone with a peripheral device using a Body Area Network (BAN). The method is performed at the cellular telephone and comprises establishing a BAN link with a peripheral device in contact with a user's body responsive to the user actuating a user control on the cellular telephone, wherein the BAN link uses the user's body as a transmission medium, receiving a passcode from the peripheral device over the BAN link, and unlocking the cellular telephone for the user if the passcode received over the BAN link is valid.

In one embodiment, establishing a BAN link with a peripheral device comprises activating a BAN transceiver at the cellular telephone responsive to the user actuating the user control.

In one embodiment, the method further comprises detecting the peripheral device responsive to the user actuating the user control.

In one embodiment, the user control comprises a power button on the cellular telephone. In such cases, the method further comprises sending a request for the passcode over the BAN link to the peripheral device responsive to the user actuating the user control.

In one embodiment, the method comprises unlocking the cellular telephone, if the passcode received over the BAN link is valid, by bypassing a passcode lock function of the cellular telephone.

In other embodiments, the method comprises the cellular telephone provisions the peripheral device with the passcode. More particularly, in one embodiment, the cellular telephone prompts the user to indicate whether to use the peripheral device to unlock the cellular telephone for subsequent accesses. Provided the user answers the prompt affirmatively, the cellular telephone 14 generates and sends the passcode to the peripheral device for storage at the peripheral device.

The present disclosure also provides a cellular telephone comprising a Body Area Network (BAN) transceiver, a user control, and a processor circuit. The BAN transceiver is configured to communicate data with a peripheral device that is in contact with a user's body. The user control is operatively connected to the BAN transceiver, and may be actuated by the user. The processor circuit is configured to control the BAN transceiver to establish a BAN link with the peripheral device responsive to the user actuating the user control, wherein the BAN link uses the user's body as a transmission medium, receive a passcode from the peripheral device over the BAN link, and unlock the cellular telephone for the user if the passcode received over the BAN link is valid.

In one embodiment, the processor circuit is further configured to activate the BAN transceiver responsive to the user actuating the user control.

In one embodiment, the processor circuit is further configured to detect the peripheral device responsive to the user actuating the user control.

In one embodiment, the user control comprises a power button.

In one embodiment, the processor circuit is further configured to request the passcode from the peripheral device responsive to the user actuating the user control.

In one embodiment, the processor circuit is configured to unlock the cellular telephone by bypassing a passcode lock function at the cellular telephone if the passcode received over the BAN link is valid.

In one embodiment, the processor circuit is further configured to provision the peripheral device with the passcode.

In one embodiment, the processor circuit is further configured to detect a first actuation of the user control by the user, in response to detecting the first actuation, prompt the user to indicate whether to use the peripheral device to unlock the cellular telephone responsive to detecting subsequent actuations of the user control, generate the passcode if the user indicates using the peripheral device to unlock the cellular telephone responsive to detecting the subsequent actuations of the user control, and send the passcode to the peripheral device over the BAN link for storage at the peripheral device.

The present disclosure also provides a computer readable medium for a cellular telephone. In one embodiment, the computer readable medium is configured to store a control program that, when executed by a processor circuit on the cellular telephone, controls the cellular telephone to establish a Body Area Network (BAN) link with a peripheral device in contact with a user's body responsive to the user actuating a user control on the cellular telephone, wherein the BAN link uses the user's body as a transmission medium, receive a passcode from the peripheral device over the BAN link, and unlock the cellular telephone for the user if the passcode received over the BAN link is valid.

In one embodiment, responsive to the user actuating the user control, the control program is further configured to control the cellular telephone to activate a BAN transceiver at the cellular telephone to establish the BAN link, request the passcode from the peripheral device via the BAN link, and, provided the passcode received from the peripheral device is valid, bypass a passcode lock function at the cellular telephone.

In one embodiment, the control program is further configured to control the cellular telephone to provision the peripheral device with the passcode via the BAN link. In such embodiments, the control program controls the cellular telephone to prompt the user to indicate whether to use the peripheral device to unlock the cellular telephone for subsequent accesses, generate the passcode if the user indicates using the peripheral device to unlock the cellular telephone for subsequent accesses, and send the passcode to the peripheral device for storage at the peripheral device via the BAN link.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

The present disclosure provides a method and corresponding apparatus that utilizes a user's own body as a transmission medium to carry the signals and data required to automatically unlock the user's cellular telephone. More particularly, a wristlet is worn by the user such that the wristlet directly contacts the user's skin. The wristlet is also primed with a passcode that is to be used to unlock the cellular telephone. When the user holds the cellular telephone in his or her hand and depresses or actuates a user control, such as the power button or other control on the cellular telephone that "wakes" the cellular telephone from an idle state, for example, the wristlet sends the stored passcode through a communications link that uses the user's body as a transmission medium. Upon receipt of the passcode, the cellular telephone unlocks the cellular telephone if the passcode is valid. If the passcode is not valid, the cellular telephone provides the user with a passcode screen for the user to manually enter the passcode.

Figure 1:
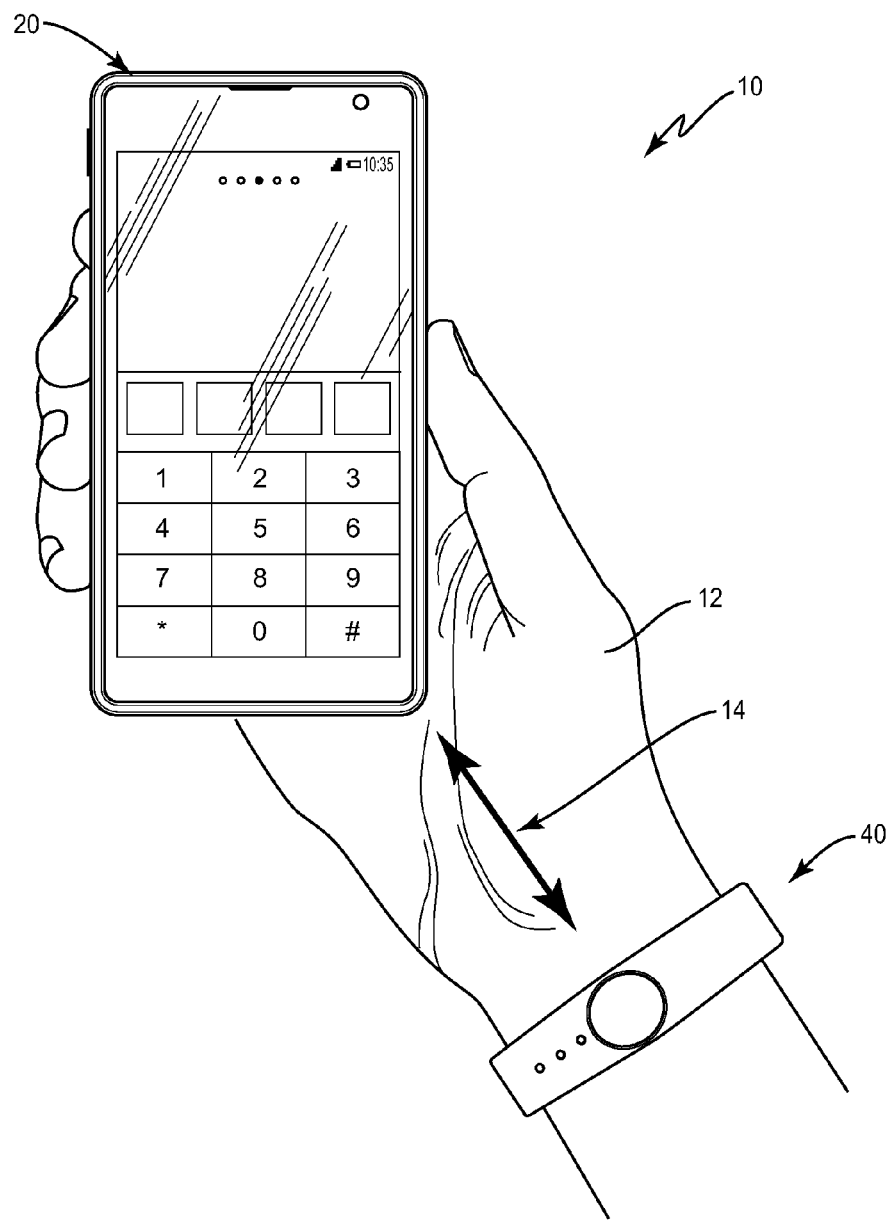
FIG. 1 is a perspective view of a cellular telephone and corresponding wristlet configured according to one embodiment of the present disclosure.

Turning now to the drawings, FIG. 1 is a perspective view of a system 10 configured according to one embodiment. As seen in FIG. 1, system 10 comprises a pair of wireless devices 20, 40 associated with a user. The two devices are configured to pair with one another, and in this embodiment, comprise a cellular telephone 20 held in the user's hand 12, and a wearable device, such as a wristlet 40 worn around the wrist of the hand 12 that is holding the cellular telephone 20. As described in more detail later, both the cellular telephone 20 and the wristlet 40 comprise communication circuitry and corresponding software that enables the devices to establish a bi-directional communications link within or on the user's body, and to communicate the data and signals needed for automatically unlocking cellular telephone 20 over that link.

More particularly, the cellular telephone 20 and the wristlet 40 (collectively, "devices 20, 40") establish a bidirectional communications link between them so as to allow devices 20, 40 to communicate signals and data securely. Although the devices 20, 40, in some embodiments, may communicate with each other over an air interface that is external to, but proximate, the user's body (e.g., a Bluetooth LE link), at least one communication link utilizes the user's own body as a transmission medium to carry the signals and data between the devices 20, 40. Such links—i.e., those links that are within or on the user's body—are referred to herein as "Body Area Network" (BAN) communication links or BAN links 14.

Body Area Networks (BANs), which may also be referred to as a "Wireless Body Area Networks" (WBANs), is fully described in the IEEE standard P802.15.6/D01 published in May 2012 and entitled, "Wireless Medium Access Control (MAC) and Physical Layer (PHY) Specifications for Wireless Personal Area Networks (WPANs) Used in or Around a Body." Briefly, BAN is a technology that utilizes low-power sensor circuitry disposed in and on a user's body to provide real-time monitoring of the user. Conventionally, this technology has been utilized for the real-time health monitoring patients and diagnosing their conditions and illnesses (e.g., diabetes monitoring, and the like); however, in this disclosure, BAN link 14 is utilized to securely communicate the signals and data that are required for the wristlet 40 to unlock the cellular telephone 20 automatically for the user. More particularly, the user's own body (e.g., the user's hand, wrist, arm, etc.) functions as a "connector" between the two devices 20, 40. So-connected, the devices 20, 40 are able to transmit and receive passcodes and other secure information. According to the present disclosure, at least some of this information is used to bypass the conventional manual entry passcode screen on the cellular telephone, and instead, automatically unlock the user's cellular telephone.

Figure 2:
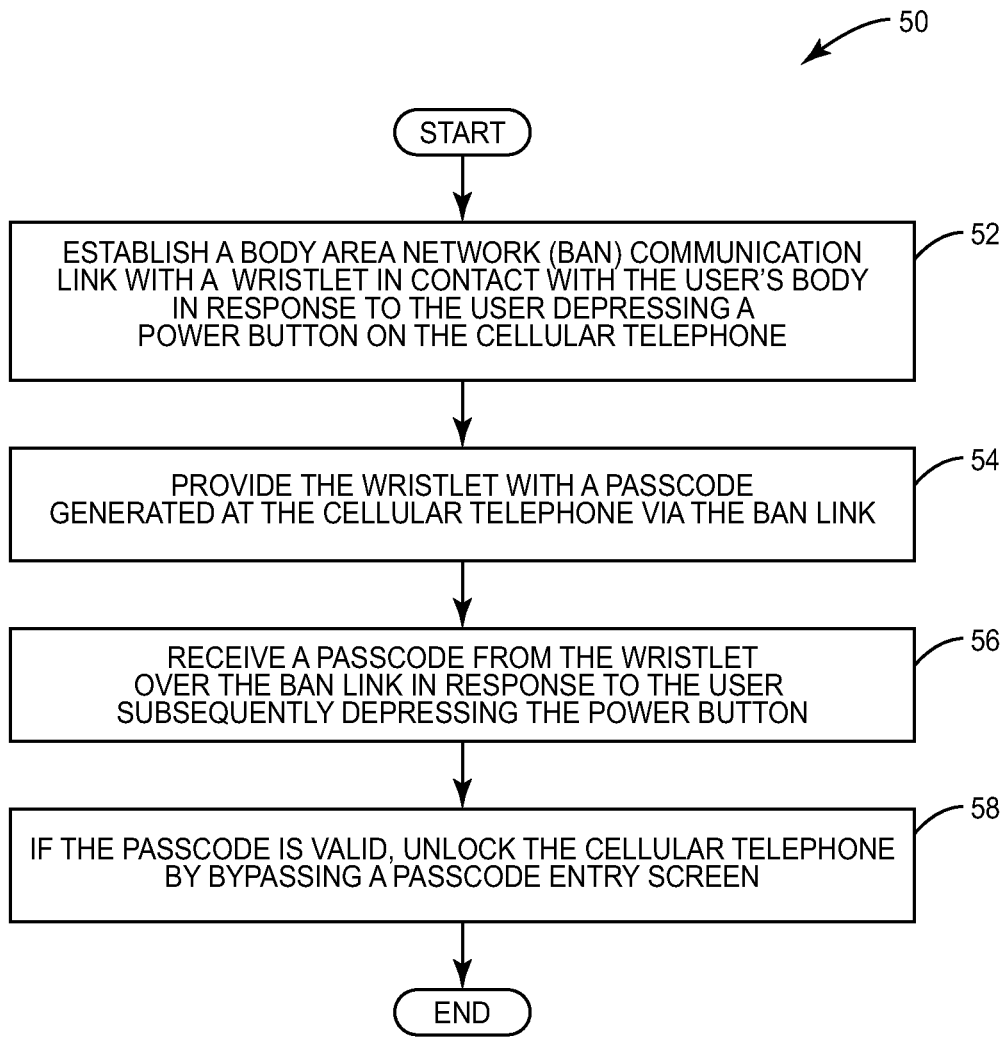
FIG. 2 is a flow diagram illustrating a method for securely unlocking a cellular telephone according to one embodiment of the present disclosure.

FIG. 2 is a flow diagram illustrating a method 50 for automatically unlocking a cellular telephone 20 by using the user's own body as a transmission medium to transmit the information needed to unlock the cellular telephone 20 according to one embodiment of the present disclosure. Method 50, which is performed by the cellular telephone 20, assumes that the user is holding the cellular telephone 20 in his or her hand, and is wearing the wristlet 40 on the wrist of the hand that is holding the cellular telephone 20. Method 50 further assumes that the wristlet 40 directly contacts the user's skin.

Method 50 begins when the user depresses or otherwise actuates a user control (e.g., a power button or some other user control) on cellular telephone 20. Particularly, in response to detecting that the user has depressed the user control, the cellular telephone 20 establishes a BAN link 14 with the wristlet 40 (box 52). Once BAN link 14 is established, the cellular telephone 20 will, at the request of the user, generate a passcode and provide that passcode to the wristlet 40 via the BAN link 14 (box 54). Upon receipt, the wristlet 40 will store the passcode in its internal memory circuit.

As stated previously, transmitting the passcode over the BAN link 14 greatly increases security. Specifically, because the passcode is being sent only a very short distance on or through the user's body 12, the cellular telephone 20 can be certain that the wristlet 40 will receive and store the passcode. This mode of transmission greatly reduces the chances that a malicious third party hacker will be able to successfully intercept the passcode.

Thereafter, the user may, optionally, put the cellular telephone 20 down. However, after some time, the user may wish to once again access the cellular telephone 20. Thus, the user once again depresses the user control on the cellular telephone, and in response, receives the passcode stored at the wristlet 40 over the BAN link 14 (box 56). The cellular telephone 20 then validates the passcode and unlocks the cellular telephone 20 for the user if the passcode is valid (box 58).

Figure 3:
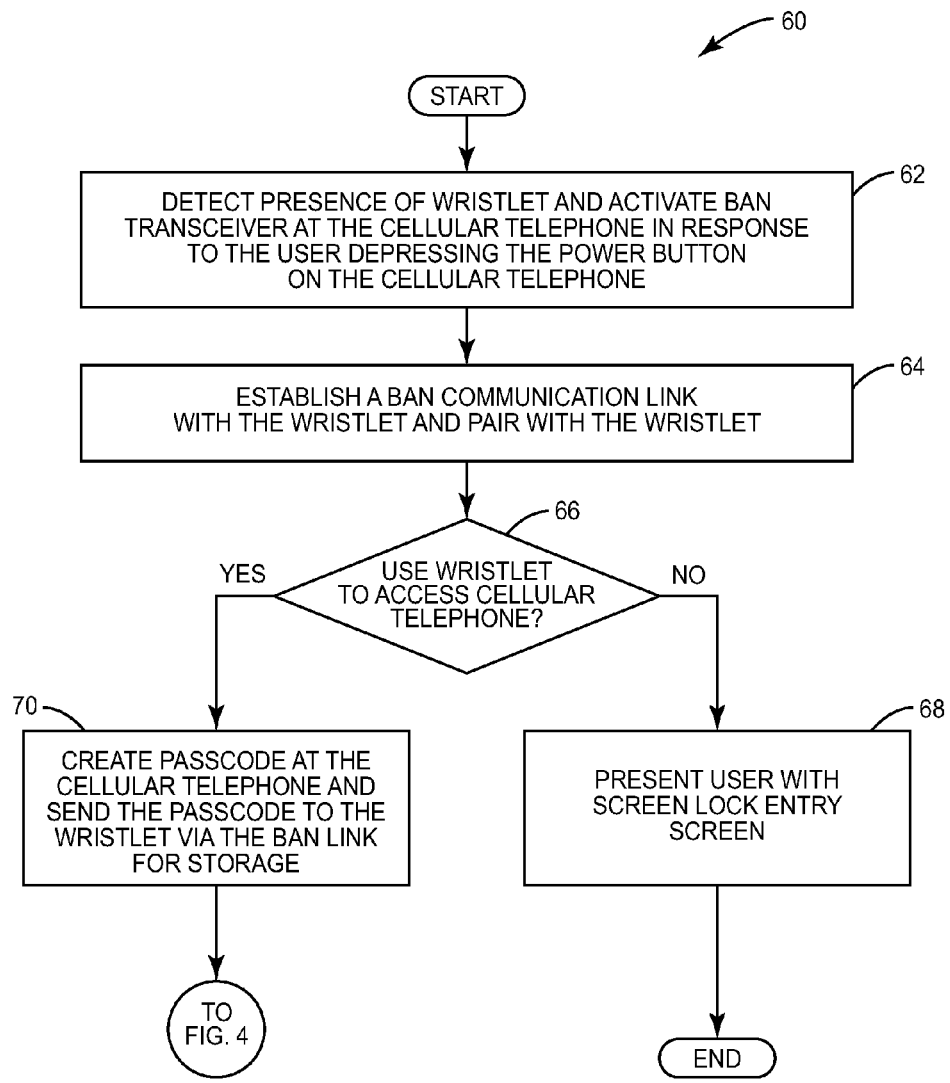
FIG. 3 is a flow diagram illustrating a method for priming a wristlet with a generated passcode to be used to unlock a cellular telephone according to one embodiment of the present disclosure.

FIG. 3 is a flow diagram illustrating a method 60 of how the cellular telephone 20 provides the wristlet 40 with the passcode according to one embodiment of the present disclosure. As seen in FIG. 3, method 50 begins with the cellular telephone 20 detecting the presence of the wristlet 40 and activating a BAN transceiver (see FIG. 5) responsive to the user depressing a user control, such as the power button of the cellular telephone 20, for example, that may wake the cellular telephone from an idle state (box 62). More particularly, the user control is operatively connected to the BAN transceiver such that depressing the user control automatically activates the BAN transceiver. Upon activation, the BAN transceiver transmits signals at timed intervals that are received by a corresponding BAN transceiver in wristlet 40. Once detected, the BAN transceivers establish the BAN link 14 between them and pair with each other (box 64).

The cellular telephone 20 is then programmed to display a prompt to the user requesting whether the user wishes to utilize the wristlet 40 to automatically unlock the cellular telephone 20 whenever the user subsequently depresses the user control to access the cellular telephone 20 (box 66). If the user declines, the cellular telephone 20 will present the user with the passcode screen lock, as is conventional (box 68). In such cases, the user will be required to manually enter the passcode, as is conventional. If, however, the user indicates the he or she wishes to utilize the wristlet 40 as a subsequent unlock mechanism for the cellular telephone 20 (box 66), the cellular telephone 20 will create the passcode and send the generated passcode to the wristlet 40 via the BAN link 14 for storage in memory at the wristlet 40 (box 70).

Figure 4:
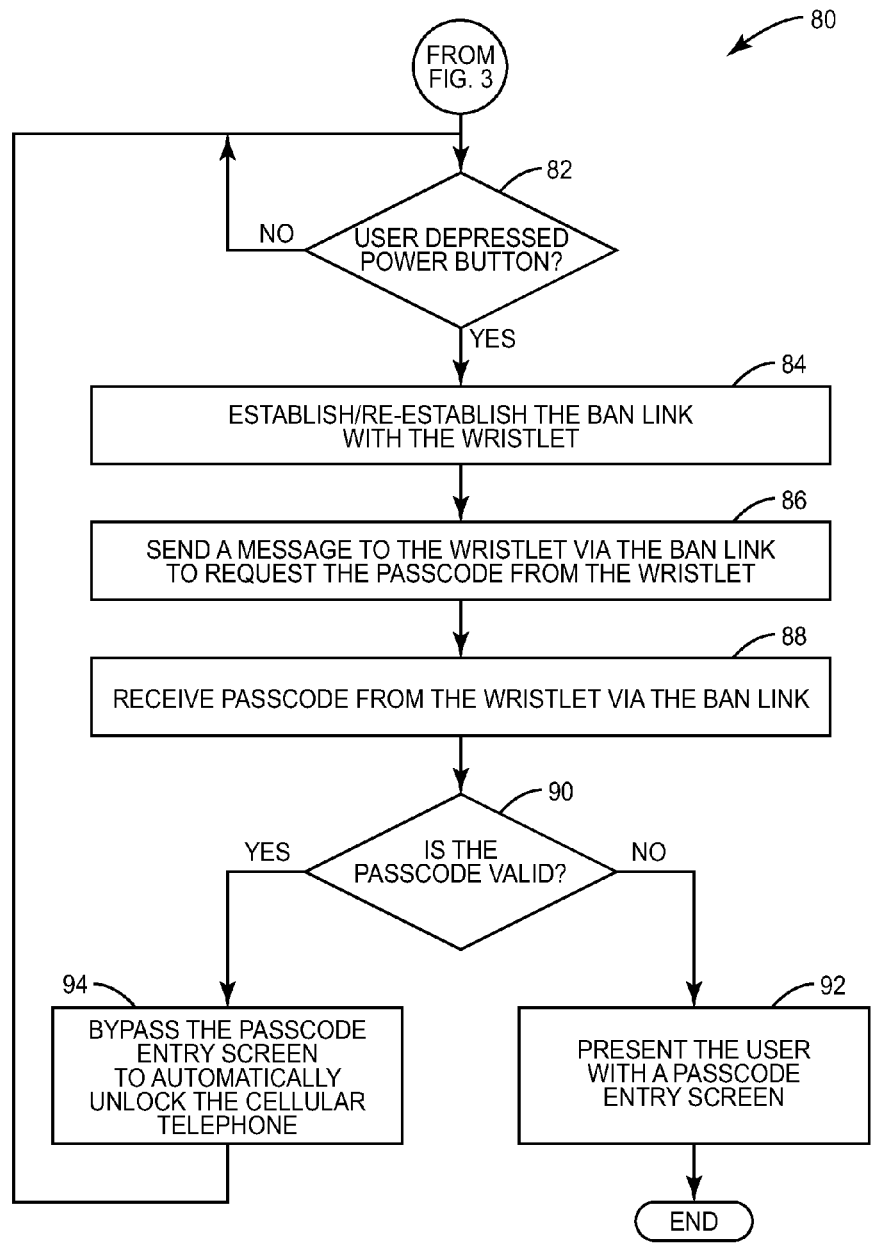
FIG. 4 is a flow diagram illustrating a method for automatically unlocking a cellular telephone held by a user according to one embodiment of the present disclosure.

FIG. 4 is a flow diagram illustrating a method 80 for providing the passcode from the wristlet 40 to the cellular telephone 20 to automatically unlock the cellular telephone 20 according to one embodiment of the present disclosure. As seen in FIG. 4, the cellular telephone 20 once again determines that the user has depressed the user control, (e.g., the power button or other user control) on the cellular telephone 20 (box 82). In response, the cellular telephone 20 establishes, or re-establishes, the BAN link 14 using the known protocol and actions of its BAN transceiver (box 84). Once the BAN link 14 is established, the cellular telephone 20 generates and sends a request message to the wristlet 40 via the BAN link 14 requesting the passcode from the wristlet 40 (box 86). The wristlet 40 then retrieves the passcode from its memory and sends the passcode to the cellular telephone 20 via the BAN link 14 (box 88). The cellular telephone 20 then checks to determine whether the received passcode is valid (box 90). If not, the cellular telephone 20 simply displays the user with the conventional manual entry screen for the passcode. Otherwise, the cellular telephone 20 bypasses the conventional screen lock functionality and automatically unlocks the cellular telephone 20 for the user (box 94). So unlocked, the user is able to access whatever information and data is on the cellular telephone 20 that he or she wants to access.

Figure 5:
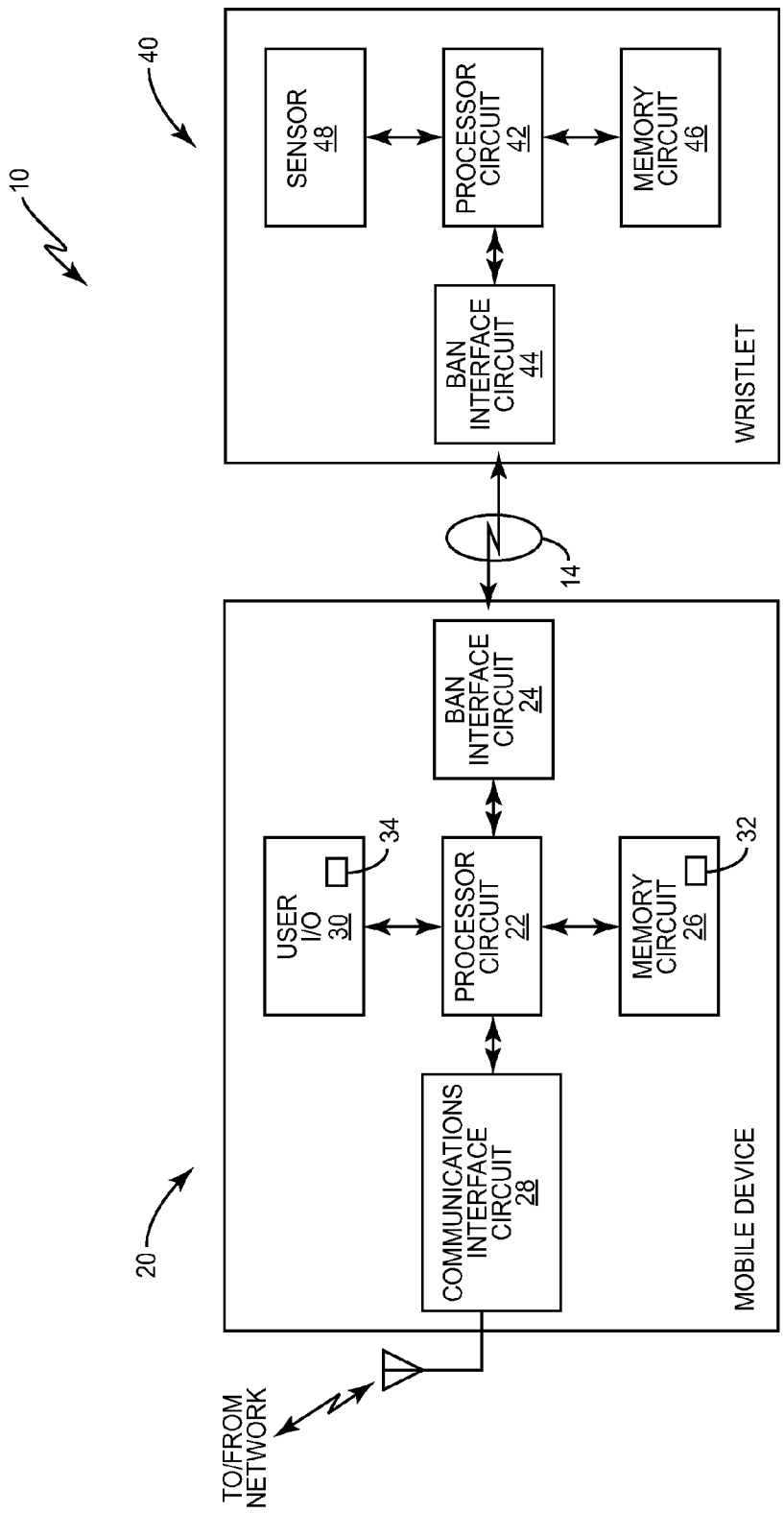
FIG. 5 is a block diagram illustrating some component parts of a cellular telephone and a wristlet configured to function according to one embodiment of the present disclosure.

FIG. 5 is a block diagram illustrating some of the components of the two devices that comprise system 10—i.e., the cellular telephone 20 and the wristlet 40. Cellular telephone 20 comprises a processor circuit 22, a BAN transceiver 24, a memory 26, a communications interface circuit 28, and a User Input/Output (I/O) interface 30.

Processor circuit 22 comprises an electronics circuit configured to generally control the operation of the cellular telephone 20 according to programs and data stored in memory 26. Such programs and data include, but are not limited to, a control program 32 comprising logic and instructions that, when executed by the processor circuit 22, detect the user's actuation of a user control, and in response, activate the BAN transceiver and control the establishment of BAN link 14 with the wristlet 40. The programs and data may also configure the processing circuit 22 to generate the passcode based an identifier sent by the wristlet 40, for example, or on data input manually by the user. Processing circuit 22 may be implemented, for example, in a single microprocessor, or in multiple microprocessors. Suitable microprocessors may include general purpose and special purpose microprocessors, as well as digital signal processors.

The BAN transceiver 24 comprises an interface circuit configured to communicate signals and data with a corresponding BAN transceiver 44 at the wristlet 40. As stated above, the BAN transceiver 24 is configured to transmit and receive signals and data using the user's own body as the transmission medium (i.e., within or on the user's body). Generally, the distance between the two BAN transceivers 24, 44 is relatively short. In one embodiment, for example, the user will wear the wristlet 40 on the wrist of the same hand that will hold the cellular telephone 20. Therefore, the BAN transceivers 24, 44 would communicate over a distance that extends between that hand and wrist. Such short distance transmissions are necessary due to the very low power output of the BAN transceivers. However, they also help to ensure the security of the transmissions carrying the passcode.

Memory circuit 26 is a computer readable medium representing the entire hierarchy of memory in, or accessible to, cellular telephone 20. Memory 26 may comprise both random access memory (RAM) and read-only memory (ROM), and may be implemented, for example, as one or more discrete devices, stacked devices, or removable devices, such as a flash drive or memory stick. In one embodiment, the memory 26 may be integrated with processor circuit 22. In other embodiments, however, memory 26 is a separate circuit. As previously stated, memory circuit 26 may store control programs 32 responsible for controlling the operation of cellular telephone 20, as well as the passcodes and other authentication information used to automatically unlock the cellular telephone 20 according to embodiments of the present disclosure.

The communications interface circuit 28 may comprise any cellular transceiver for transmitting and receiving data, such as downloaded video and/or audio content, for example, to and from a base station in a wireless communications network. Thus, in one embodiment, the communications interface circuit 28 comprises a fully functional cellular radio transceiver that operates according to any known standard. Such standards include, but are not limited to, the Global System for Mobile Communications (GSM), TIA/EIA-136, cdmaOne, cdma2000, UMTS, WiFi, and Wideband CDMA.

The User I/O interface (UI) 30 provides a user with the necessary components to interact with the cellular telephone 20. Typically, the UI 30 includes a display, a speaker, a microphone, and a variety of user controls, which may include, but is not limited to, a keypad or buttons, such as power button 34, or other user control that, when actuated by a user, may wake the cellular telephone 20 form an idle state. In one embodiment, the processing circuit 22 controls the UI 30 to display a prompt to the user in which the user is asked to indicate whether he/she wishes to utilize wristlet 40 to automatically unlock the cellular telephone 20 when the user accesses the cellular telephone 20 while wearing wristlet 40. Such prompts may comprise, for example, a dialog window displayed to the user.

As seen in FIG. 5, the power button 34 is communicatively connected to the processor 22. Therefore, whenever the user depresses the power button 34, or other user control, the processor 22 is able to detect the action. In response, the processor 22 generates one or more control signals to activate the BAN transceiver 24 and establish the BAN link 14 with BAN transceiver 44, as previously described.

Wristlet 40 also comprises a variety of components including, but not limited to, a processor circuit 42, a BAN transceiver 44, a memory circuit 46, and a sensor 48. The processor circuit 42 may also comprise an electronics circuit configured to generally control the operation of the wristlet 40 according to programs and data stored in memory 50. Such programs and data include, but are not limited to, logic and instructions that, when executed by the processor circuit 42, control the establishment of BAN link 14. The programs and data may also configure the processing circuit 42 to retrieve and send a unique identifier (e.g., a hardware identifier of wristlet 40) to the cellular telephone 20 upon receiving a request for such information, as well as to store a passcode generated by the cellular telephone 20 in memory 50. Additionally, the programs and data may also configure the processor circuit 42 receive signals from sensor 48, and activate the BAN transceiver 44 to communicate with BAN transceiver 24 via BAN link 14. As above, the processing circuit 42 may be implemented, for example, in a single microprocessor, or in multiple microprocessors. Suitable microprocessors may include general purpose and special purpose microprocessors, as well as digital signal processors.

The BAN transceiver 44 also comprises a transmitter and a receiver, and is controlled according to embodiments of the present disclosure to communicate with the corresponding BAN transceiver 24 at the cellular telephone 20. In one embodiment, BAN transceiver 44 receives the passcode from the BAN transceiver 24, and then sends the passcode back to the BAN transceiver 24 upon request to allow the cellular telephone 20 to automatically unlock the cellular telephone 20 for the user. As stated previously, the data and signals communicated between by BAN transceiver 44 uses the user's own body as a transmission medium.

Memory circuit 46 is a computer readable medium representing the entire hierarchy of memory in, or accessible to, wristlet 40. Memory 46 may comprise both random access memory (RAM) and read-only memory (ROM), and may be implemented, for example, as one or more discrete devices, stacked devices, or removable devices, such as a flash drive or memory stick. In one embodiment, the memory 46 may be integrated with processor circuit 42. As previously stated, memory circuit 46 may store the logic and instructions responsible for controlling the operation of wristlet 40, as well as for storing passcodes generated by the cellular telephone 20.

The sensor 48 can be any sensor known in the art configured to detect when the wristlet is secured to the user's wrist. In one embodiment, such a sensor may comprise a "tremor sensor" configured to detect the tremors present in human muscles. As stated previously, such sensors are able to sense tremors within the 8-12 Hz range. However, other sensors are also possible, such as those that are configured to detect body temperature, blood flow, and pulse, for example. As stated above, signals coming from sensor 48 may be received at the processor circuit 42, and used as a trigger to activate BAN transceiver 44 and establish BAN link 14.

Those of ordinary skill in the art should readily appreciate that the present disclosure is not limited to pairing a cellular telephone 20 and a wristlet 40, but rather, may be implemented in other devices in addition to, or in lieu of, devices 20, 40. For example, the wristlet 40 need not comprise a wristlet, but rather, may be embodied as any wearable device, such as a ring or necklace, for example.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for unlocking a cellular telephone with a peripheral device using a Body Area Network (BAN), the method performed at the cellular telephone and comprising:
   establishing a wireless communications link with one or more remote communications devices via a wireless communications network, wherein the wireless communications link comprises an air interface;
   establishing a BAN link with a peripheral device in contact with a user's body responsive to the user actuating a user control on the cellular telephone, wherein the BAN link uses the user's body as a transmission medium;
   receiving a passcode from the peripheral device over the BAN link;
   determining whether the passcode received over the BAN link is valid;
   responsive to determining that the passcode received over the BAN link is not valid:
      invoking a passcode lock function on the cellular telephone that requires the user to manually enter the passcode; and
      maintaining the cellular telephone in a locked state to prevent the user from accessing the data stored on the cellular telephone until the user enters a valid passcode; and
   responsive to determining that the passcode received over the BAN link is valid:
      bypassing the passcode lock function on the cellular telephone that requires the user to manually enter the passcode to access the data stored on the cellular telephone; and
      unlocking the cellular telephone for the user, wherein unlocking the cellular telephone allows the user to access the data stored on the cellular telephone.

2. The method of claim 1 wherein establishing a BAN link with a peripheral device comprises activating a BAN transceiver at the cellular telephone responsive to the user actuating the user control.

3. The method of claim 1 further comprising detecting the peripheral device responsive to the user actuating the user control.

4. The method of claim 1 wherein the user control comprises a power button on the cellular telephone.

5. The method of claim 1 further comprising sending a request for the passcode to the peripheral device responsive to the user actuating the user control.

6. The method of claim 1 further comprising provisioning the peripheral device with the passcode.

7. The method of claim 6 wherein provisioning the peripheral device with the passcode comprises:
   prompting the user to indicate whether to use the peripheral device to unlock the cellular telephone for subsequent accesses;
   generating the passcode if the user indicates using the peripheral device to unlock the cellular telephone for subsequent accesses;
   sending the passcode to the peripheral device for storage at the peripheral device.

8. A cellular telephone comprising:
   a wireless transceiver configured to transmit signals to and receive signals from one or more remote communication devices over an air interface;
   a Body Area Network (BAN) transceiver configured to communicate data with a peripheral device that is in contact with a user's body;
   a user control operatively connected to the BAN transceiver, and configured to be actuated by the user; and
   a processor circuit configured to:
      control the wireless transceiver to establish a wireless communications link with the one or more remote communication devices via a wireless communications network;
      control the BAN transceiver to establish a BAN link with the peripheral device responsive to the user actuating the user control, wherein the BAN link uses the user's body as a transmission medium;
      receive a passcode from the peripheral device over the BAN link;
      determine whether the passcode received over the BAN link is valid;
      responsive to determining that the passcode received over the BAN link is not valid:
         invoke a passcode lock function on the cellular telephone that requires the user to manually enter the passcode; and
         maintain the cellular telephone in a locked state to prevent the user from accessing the data stored on the cellular telephone until the user enters a valid passcode; and
      responsive to determining that the passcode received over the BAN link is valid:
         bypass the passcode lock function on the cellular telephone that requires the user to manually enter the passcode to access the data stored on the cellular telephone; and
         unlock the cellular telephone for the user, to allow the user to access the data stored on the cellular telephone.

9. The cellular telephone of claim 8 wherein the processor circuit is further configured to activate the BAN transceiver responsive to the user actuating the user control.

10. The cellular telephone of claim 8 wherein the processor circuit is further configured to detect the peripheral device responsive to the user actuating the user control.

11. The cellular telephone of claim 8 wherein the user control comprises a power button.

12. The cellular telephone of claim 8 wherein the processor circuit is further configured to request the passcode from the peripheral device responsive to the user actuating the user control.

13. The cellular telephone of claim 8 wherein the processor circuit is further configured to provision the peripheral device with the passcode.

14. The cellular telephone of claim 13 wherein to provision the peripheral device with the passcode, the processor circuit is further configured to:
   detect a first actuation of the user control by the user;
   in response to detecting the first actuation, prompt the user to indicate whether to use the peripheral device to unlock the cellular telephone responsive to detecting subsequent actuations of the user control;
   generate the passcode if the user indicates using the peripheral device to unlock the cellular telephone responsive to detecting the subsequent actuations of the user control; and send the passcode to the peripheral device over the BAN link for storage at the peripheral device.

15. A non-transitory computer readable medium for a cellular telephone, the computer readable medium configured to store a control program that, when executed by a processor circuit on the cellular telephone, controls the cellular telephone to:
    establish a wireless communications link with one or more remote communications devices via a wireless communications network, wherein the wireless communications link comprises an air interface;
    establish a Body Area Network (BAN) link with a peripheral device in contact with a user's body responsive to the user actuating a user control on the cellular telephone, wherein the BAN link uses the user's body as a transmission medium;
    receive a passcode from the peripheral device over the BAN link; and
    determine whether the passcode received over the BAN link is valid;
    responsive to determining that the passcode received over the BAN link is not valid:
        invoke a passcode lock function on the cellular telephone that requires the user to manually enter the passcode; and
        maintain the cellular telephone in a locked state to prevent the user from accessing the data stored on the cellular telephone until the user enters a valid passcode; and
    responsive to determining that the passcode received over the BAN link is valid:
        bypass the passcode lock function on the cellular telephone that requires the user to manually enter the passcode to access the data stored on the cellular telephone; and
        unlock the cellular telephone for the user to allow the user to access the data stored on the cellular telephone.

16. The computer readable medium of claim 15 wherein, responsive to the user actuating the user control, the control program is further configured to control the cellular telephone to:
    activate a BAN transceiver at the cellular telephone to establish the BAN link; and
    request the passcode from the peripheral device via the BAN link.

17. The computer readable medium of claim 16 wherein to provision the peripheral device with the passcode, the control program is further configured to control the cellular telephone to:
    prompt the user to indicate whether to use the peripheral device to unlock the cellular telephone for subsequent accesses;
    generate the passcode if the user indicates using the peripheral device to unlock the cellular telephone for subsequent accesses;
    send the passcode to the peripheral device for storage at the peripheral device via the BAN link.

18. The computer readable medium of claim 15 wherein the control program is further configured to control the cellular telephone to provision the peripheral device with the passcode via the BAN link.

* * * * *